United States Patent
Arai et al.

(10) Patent No.: US 9,475,361 B2
(45) Date of Patent: Oct. 25, 2016

(54) VEHICLE HEATING AND AIR CONDITIONING SYSTEM

(75) Inventors: Fujio Arai, Yokohama (JP); Yutaka Uematsu, Zama (JP); Takayoshi Matsuoka, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 538 days.

(21) Appl. No.: 13/810,673

(22) PCT Filed: Aug. 1, 2011

(86) PCT No.: PCT/IB2011/001796
§ 371 (c)(1),
(2), (4) Date: Jan. 17, 2013

(87) PCT Pub. No.: WO2012/017294
PCT Pub. Date: Feb. 9, 2012

(65) Prior Publication Data
US 2013/0112390 A1    May 9, 2013

(30) Foreign Application Priority Data
Aug. 5, 2010  (JP) ................................. 2010-176121

(51) Int. Cl.
*B60H 1/00* (2006.01)
(52) U.S. Cl.
CPC ...... *B60H 1/00764* (2013.01); *B60H 1/00771* (2013.01); *B60H 1/00785* (2013.01); *B60H 1/00849* (2013.01)
(58) Field of Classification Search
CPC .......... B60H 1/00007; B60H 1/00814; B60H 1/00764; B60H 1/00771; B60H 1/00785; B60H 1/00849; G01C 21/26
USPC ............................. 165/202, 230, 251; 701/36
See application file for complete search history.

(56) References Cited

U.S. PATENT DOCUMENTS

| 7,696,710 B2 * | 4/2010 | Byrne et al. ................... 318/444 |
| 2004/0068998 A1 * | 4/2004 | Ieda et al. ........................ 62/186 |

(Continued)

FOREIGN PATENT DOCUMENTS

| CN | 101428544 A | 5/2009 |
| CN | 101722913 A | 6/2010 |

(Continued)

OTHER PUBLICATIONS

An English translation of the Japanese Office Action for the corresponding Japanese Application No. 2010-176121, issued Mar. 17, 2014, mailed Mar. 25, 2014.

(Continued)

*Primary Examiner* — Tho V Duong
*Assistant Examiner* — Raheena Rehman
(74) *Attorney, Agent, or Firm* — Global IP Counselors, LLP

(57) ABSTRACT

A vehicle heating and air conditioning system basically includes an interior/exterior air introducing structure, a heating device, a driving end time acquiring section and an interior/exterior air switching control section. The interior/exterior air introducing structure switches the flow of cabin intake air between an interior air recirculation mode and an exterior air introducing mode. The heating device heats the cabin intake air being introduced by the interior/exterior air introducing structure. The driving end time acquiring section estimates a driving end time corresponding to a point in time at which driving of a vehicle is predicted to end. The interior/exterior air switching control section switches the interior/exterior air introducing structure from the exterior air introducing mode to the interior air recirculation mode during a period of time from a prescribed point in time until the driving end time to restrict windshield fogging while in the interior air recirculation mode.

6 Claims, 4 Drawing Sheets

(56) References Cited

U.S. PATENT DOCUMENTS

| | | | |
|---|---|---|---|
| 2005/0045322 A1* | 3/2005 | Yoshida et al. | 165/202 |
| 2005/0121185 A1* | 6/2005 | Yonekura et al. | 165/202 |
| 2006/0000597 A1* | 1/2006 | Errington et al. | 165/204 |
| 2007/0209789 A1* | 9/2007 | Oomura et al. | 165/202 |
| 2007/0235549 A1* | 10/2007 | Nakajima | 236/44 R |
| 2007/0277544 A1* | 12/2007 | Honda et al. | 62/228.3 |
| 2009/0031741 A1* | 2/2009 | Hara et al. | 62/239 |
| 2010/0163220 A1* | 7/2010 | Nakajima | 165/202 |
| 2011/0172880 A1* | 7/2011 | Tamura | 701/36 |

FOREIGN PATENT DOCUMENTS

| | | | |
|---|---|---|---|
| DE | 10327144 B3 | | 6/2004 |
| EP | 1302344 A2 | | 4/2003 |
| JP | 7-228130 A | | 8/1995 |
| JP | 2002-36845 A | | 2/2002 |
| JP | 2008-100578 A | | 5/2008 |
| JP | 2009-190567 A | | 8/2009 |
| JP | 2009-298323 A | | 12/2009 |
| JP | 2009298323 A | * | 12/2009 |
| WO | 2010035329 A1 | | 4/2010 |
| WO | 2010/075874 A1 | | 7/2010 |

OTHER PUBLICATIONS

The Chinese Office Action for the corresponding Chinese Application No. 201180038690.4 issued on Dec. 12, 2014.

* cited by examiner

VEHICLE HEATING AND AIR CONDITIONING SYSTEM

CROSS-REFERENCE TO RELATED APPLICATIONS

This application is a U.S. National stage of International Application No. PCT/IB2011/001796, filed Aug. 1, 2011. This application claims priority to Japanese Patent Application No. 2010-176121, filed on Aug. 5, 2010. The entire disclosure of Japanese Patent Application No. 2010-176121 is hereby incorporated herein by reference.

BACKGROUND

1. Field of the Invention

The present invention generally relates to a vehicle heating and air conditioning system.

2. Background Information

Japanese Laid-Open Patent Publication No. 2008-100578 discloses a known conventional technology for an air conditioning apparatus contrived to blow air having a prescribed temperature into a vehicle cabin. The technology disclosed in that publication is contrived to prevent fogging of a windshield by switching between an interior air recirculation mode in which air inside the vehicle cabin is circulated and an exterior or fresh air introducing mode in which air from outside the cabin is introduced into the cabin, the mode switching being based on a humidity inside the cabin.

SUMMARY

It has been discovered that a heating efficiency is higher when heated interior air is circulated within a vehicle cabin using an interior air recirculation mode than when cold outside air is introduced into the vehicle cabin. Thus, it is preferable to use the interior air recirculation mode as much as possible while driving so long as the windows do not fog up. However, with the technology presented in Japanese Laid-Open Patent Publication No. 2008-100578, if the exterior air introducing mode (i.e., fresh air mode) is selected at some point while driving, then, in some cases, the heating and air conditioning system will be left in the exterior air introducing mode. As a result, the use of the interior air recirculation mode will often decline, which in turn will cause the heating efficiency to decline.

The vehicle heating and air conditioning system of this present disclosure was conceived in view of this problem. One object is to provide a vehicle heating and air conditioning system that can improve heating efficiency.

In view of the state of the known technology, one aspect of the present disclosure is to provide a vehicle heating and air conditioning system that basically comprises an interior/exterior air introducing structure, a heating device, a driving end time acquiring section and an interior/exterior air switching control section. The interior/exterior air introducing structure is configured to switch a flow of cabin intake air between an interior air recirculation mode and an exterior air introducing mode. The heating device is arranged with respect to the interior/exterior air introducing structure to heat the cabin intake air being introduced by the interior/exterior air introducing structure. The driving end time acquiring section is configured to estimate a driving end time corresponding to a point in time at which driving of a vehicle, which is equipped with the vehicle heating and air conditioning system, is predicted to end. The interior/exterior air switching control section is configured to switch the interior/exterior air introducing structure from the exterior air introducing mode to the interior air recirculation mode during a period of time from a prescribed point in time until the driving end time such that windshield fogging can be restricted while in the interior air recirculation mode.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
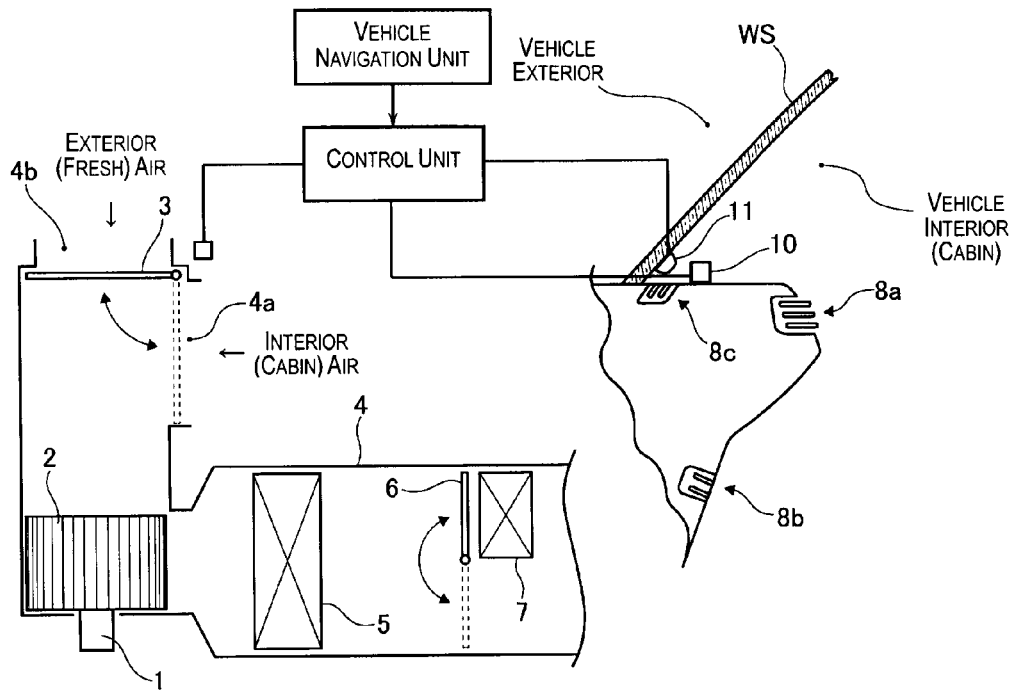
FIG. 1 is a schematic view of a vehicle heating and air conditioning system according to a first embodiment.

Referring initially to FIG. 1, an automated vehicle heating and air conditioning system is schematically illustrated in accordance with a first embodiment. The vehicle heating and air conditioning system can also be referred to as a vehicle HVAC (Heating, Ventilation, and Air Conditioning) system. In the illustrated embodiment, the vehicle heating and air conditioning system is installed in a vehicle equipped with an internal combustion engine that supplies heat to the vehicle heating and air conditioning system as discussed below. As discussed below, the automated vehicle heating and air conditioning system is configured to heat the vehicle cabin and automatically switching between an interior (cabin) air recirculation mode and an exterior air introducing mode (fresh air mode). More specifically, as explained below, the automated vehicle heating and air conditioning system acquires a predicted driving time indicating an amount of time the vehicle is estimated to be driven before driving ends, i.e., before a driving end time is reached. Based on this predicted driving time, the automated vehicle heating and air conditioning system switches to the interior air recirculation mode during a period between a prescribed point in time when it is possible to prevent a windshield from fogging and the driving end time. With the automated vehicle heating and air conditioning system, window fogging can be prevented during a period lasting until a predicted driving end time. Since the amount of time during which the interior air recirculation mode is selected will become longer, the percentage of time during which the interior air recirculation mode is used will increase regardless of a driving pattern, thus enabling a heating efficiency to be improved.

As seen in FIG. 1, the automated vehicle heating and air conditioning system includes, among other things, a blower motor 1, a blower fan 2, an interior/exterior air switching door 3 and an air conditioning unit 4 having, among other things, an evaporator 5. The air conditioning unit 4 has an inlet section provided with an interior air introducing port 4a and an exterior air introducing port 4b. The interior air introducing port 4a communicates with the vehicle cabin interior for introducing interior (cabin) air to the air conditioning unit 4. The exterior air introducing port 4b communicates with the vehicle cabin exterior for introducing exterior (fresh) air to the air conditioning unit 4. The interior air introducing port 4a and the exterior air introducing port 4b are opened and closed by the interior/exterior air switching door 3 that operates in accordance with a control signal from a controller or control unit. When one of the introducing ports 4a and 4b is opened, the other is closed by the interior/exterior air switching door 3. Thus, an induction port mode is switched by swinging the interior/exterior air switching door 3 (e.g., an air introducing structure). More specifically, a state in which the interior air introducing port 4a is open and the exterior air introducing port 4b is closed corresponds to an interior air recirculation mode (also called "REC"), and a state in which the interior air introducing port 4a is closed and the exterior air introducing port 4b is open corresponds to an exterior (fresh) air introducing mode (also called "FRE"). It is also acceptable to configure the apparatus to blend interior air and exterior air as desired and introduce the blended air into the vehicle cabin. Thus, the interior/exterior air switching door 3 is sometimes called a blending door. For the sake of brevity, hereinafter, the interior air recirculation mode shall be simply referred to as recirculation mode, and the exterior air introducing mode shall be simply referred to as fresh mode.

When the blower fan 2 is rotated by the blower motor 1, interior air and/or exterior air is drawn into the air conditioning unit 4 in accordance with the induction port mode. Thus, interior air is drawn in through the interior air introducing port 4a while the interior/exterior air switching door 3 is in the recirculation mode. On the other hand, exterior air is drawn in through the exterior air introducing port 4b while the interior/exterior air switching door 3 is in the fresh mode. The air that was drawn into the air conditioning unit 4 then passes through the evaporator 5 such that the intake air is cooled and dehumidified when the evaporator 5 is operating. Then, depending on an opening degree of an air mix door 6, either the intake air passes through a heater core 7 (e.g., a heating device) where the intake air is heated, or the intake air bypasses the heater core 7 without being heated. In FIG. 1, the air mix door 6 is illustrated at a minimum opening degree such that all of the intake air passing through the evaporator 5 bypasses the heater core 7. When a heating is required, the air mix door 6 can be set such that some or all of the air passes through the heater core 7. When the air mix door 6 is set to maximum opening degree as illustrated in dashed lines in FIG. 1, all of the air passes through the heater core 7. However, when the air mix door 6 is set to a position in between the minimum and maximum opening degrees, some of the intake air passing through the evaporator 5 and some of the intake air bypasses the heater core 7. The heater core 7 is heated with a well-known method such as hot coolant from the engine that is circulated through the heater core 7. The air passing through the heater core 7 and the air that has bypassed the heater core 7 are mixed downstream of the heater core 7 and then discharged in to the cabin from one or more discharge ports (e.g., a vent air discharge port 8a, a foot air discharge port 8b and a defrost air discharge port 8c) in accordance with an air discharge mode that is set by the user or the control unit. For example, in a vent mode the conditioned air is discharged from the vent discharge port 8a toward a passenger's upper body, in a foot mode the conditioned air is discharged from the foot air discharge port 8b toward a passenger's feet, and in a defrost mode the conditioned air is discharged from the defrost discharge port 8c toward a windshield WS.

The vehicle air conditioning unit 4 is incorporated into an automated air conditioning system that controls a cabin interior temperature in an automated fashion and the induction port mode, the discharge port mode, the blowing rate of the blower fan 2, and the opening degree of the air mix door 6 are controlled according to a set temperature that is inputted to the control unit. The control unit of the vehicle heating and air conditioning system preferably includes a microcomputer with an HVAC control program that at least controls the blowing rate of the blower fan 2, the position of the interior/exterior air switching door 3, the operating points of the evaporator 5, the position of the air mix door 6, a temperature of the heater core 7 and the positions of the discharge ports 8a, 8b and 8c. The control unit can also include other conventional components such as an input interface circuit, an output interface circuit, and storage devices such as a ROM (Read Only Memory) device and a RAM (Random Access Memory) device. The control unit can be a dedicated unit for the HVAC system or can be used to selectively controlling any of components as needed and/or desired.

Figure 2:
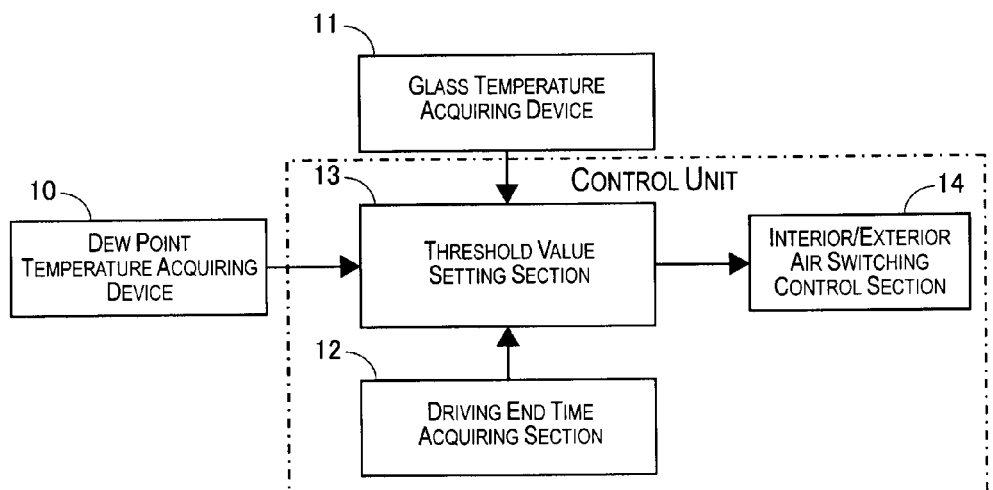
FIG. 2 is a control block diagram showing constituent features of a mode switching control of the vehicle heating and air conditioning system according to the first embodiment.

FIG. 2 is a control block diagram showing constituent features of a mode switching control of the vehicle heating and air conditioning system according to the first embodiment. As seen in FIG. 2, the vehicle heating and air conditioning system includes a dew point temperature acquiring sensor or device 10 and a glass temperature acquiring sensor or device 11 for obtaining data relating to cabin conditions. Also in this first embodiment, the control unit of the vehicle heating and air conditioning system includes a threshold setting section 13, a driving time acquiring section 12 and an interior/exterior air switching section 14 that are used to set the interior/exterior air switching door 3 (e.g., an air introducing structure) based on at least signals from the dew point temperature acquiring sensor 10 and the glass temperature acquiring sensor 11

In this first embodiment, the dew point temperature acquiring sensor 10 is provided on a cabin interior side of the windshield WS. The dew point temperature acquiring sensor 10 acquires a dew point temperature of the cabin air based on a temperature and relative humidity of the air flowing near the surface of the windshield WS. A dew point temperature is a temperature at which water vapor contained in air will start to condense when the air is cooled. More specifically, a water vapor pressure is determined based on a temperature and a relative humidity and a temperature at which the water vapor pressure becomes a saturated water vapor pressure is determined as a dew point temperature. The relative humidity is a value obtained by dividing an amount of water vapor contained in ambient air at a given temperature by a saturated water vapor amount corresponding to that temperature. A relative humidity of 100% indicates that the amount of water vapor in the ambient air is saturated and condensation will occur. In other words, a dew point temperature is a temperature at which the relative humidity is 100%.

In this first embodiment, the glass temperature acquiring sensor 11 is installed on the vehicle interior side of the windshield WS. The glass temperature acquiring sensor 11 acquires a glass temperature of a surface of the windshield WS on the vehicle interior side. Based on an estimated (predicted) driving time required to reach a set destination calculated by a navigation system, a driving time acquiring section 12 acquires an estimated time of arrival (driving end time) and a time to reach the destination from a current location (amount of driving time remaining before reaching the driving end time). It is also acceptable to use a driving time amount set in advance by a driver or to calculate based on a driving time amount estimated based on a normal driving pattern.

The threshold setting section 13 of this first embodiment will now be explained. Basically, when the recirculation mode is selected, the heating efficiency is high because previously heated air from inside the vehicle cabin is being recirculated. However, when the fresh mode is selected, it is necessary to warm the cool exterior air and the heating efficiency is low. However, in the recirculation mode, water vapor (e.g., breath and perspiration) given off from a person inside the vehicle become mixed in the interior air and the dew point temperature rises with the resulting rise in relative humidity. Conversely, in the fresh mode, the relative humidity and, thus, the dew point temperature both decrease because the amount of water vapor contained in the air is smaller. Generally, when the dew point temperature exceeds the glass temperature, the windshield WS will fog up. Therefore, a maximum temperature threshold $\alpha$ is set to either the current glass temperature as detected by the glass temperature acquiring sensor 11 or, to be conservative, a value slightly lower than the current glass temperature. Meanwhile, a minimum temperature threshold value $\beta$ is set to, for example, either the current dew point temperature of the exterior air as detected by the dew point temperature acquiring sensor 10 or, to be conservative, a value slightly higher than the dew point temperature. The minimum temperature threshold value $\beta$ is corrected in accordance with a predicted (estimated) driving time amount.

Figure 5:
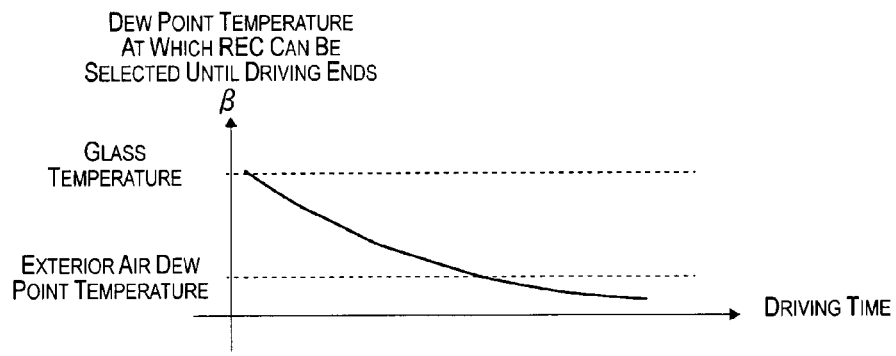
FIG. 5 is a characteristic diagram showing a dew point variation characteristic according to the first embodiment.

The correction of the threshold value according to the predicted (estimated) driving time amount will now be explained in detail. First, a relationship is calculated between the driving time amount and a dew point temperature at which window fogging will not occur even if the recirculation mode is used. For example, an amount of moisture per person is multiplied by the number of passengers and an amount of time until the dew point temperature changes from a particular dew point temperature to the glass temperature is plotted on a graph. FIG. 5 is a characteristic diagram showing a dew point temperature variation characteristic according to the first embodiment. Based on the plotted result, a dew point temperature calculated based on a remaining driving time amount until a destination is reached is set as a minimum threshold value to be used by the threshold value setting section 13, i.e., as the minimum temperature threshold value $\beta$. However, if the calculated dew point temperature is lower than the dew point temperature of the exterior air, then the dew point temperature of the exterior air is set as the minimum temperature threshold value $\beta$. In this way, the recirculation mode can be used until window fogging is on the verge of occurring when the driving end time is reached.

Figure 3:
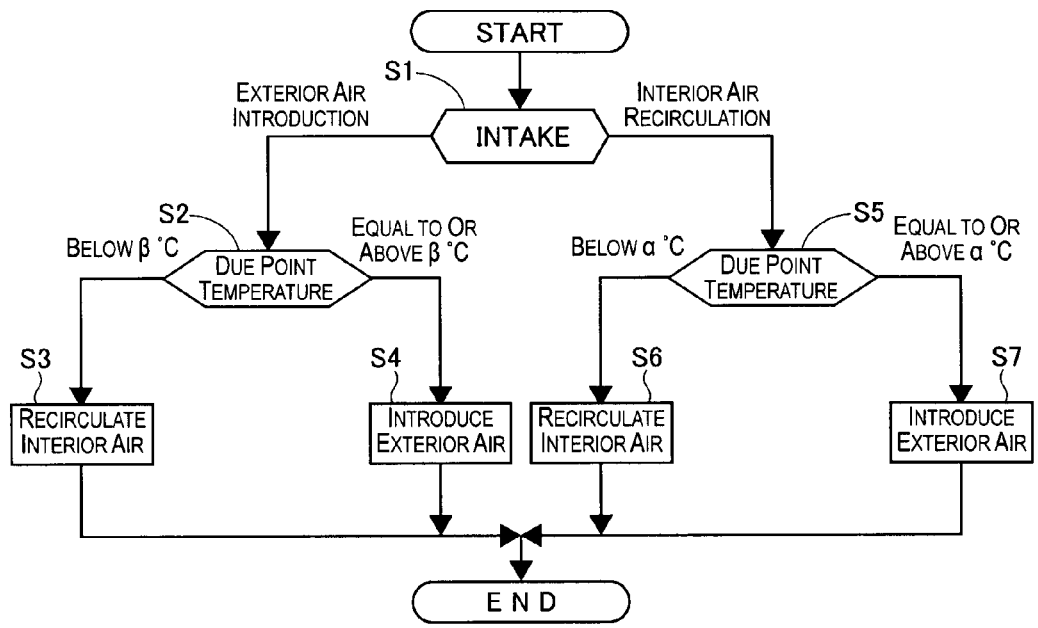
FIG. 3 is a flowchart expressing a mode switching control scheme according to the first embodiment.
Figure 4:
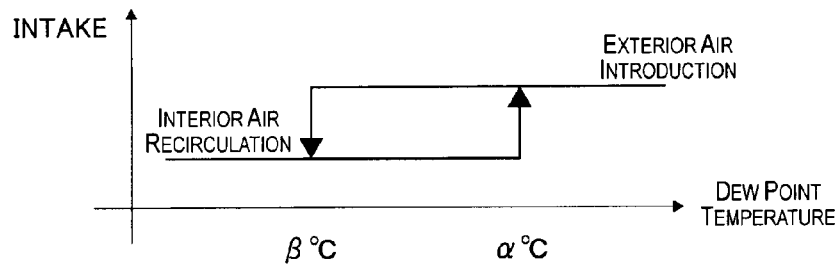
FIG. 4 is a map expressing a mode switching control scheme according to the first embodiment.

The interior/exterior air switching section 14 switches the interior/exterior air switching door 3 based on an acquired dew point temperature and the maximum temperature threshold value $\alpha$ and the minimum temperature threshold value $\beta$ set by the threshold value setting section 13, thereby selecting the recirculation mode or the fresh mode. A control scheme of the interior/exterior air switching section 14 will now be explained with reference to FIGS. 3 and 4. FIG. 3 shows a flowchart expressing a mode switching control scheme according to the first embodiment. FIG. 4 shows a control map expressing a mode switching control scheme according to the first embodiment. FIGS. 3 and 4 illustrate basically the same content.

In step S1, the interior/exterior air switching section 14 determines if the currently selected mode is the fresh mode or the recirculation mode. The mode switching control proceeds to step S2 if the fresh mode is selected. On the other hand, the mode switching control proceeds to step S5 if the recirculation mode is selected.

In step S2, the interior/exterior air switching section 14 determines if the current dew point temperature, as determined by the dew point temperature acquiring sensor 10, is equal to or larger than the minimum temperature threshold value $\beta$. If so, then the interior/exterior air switching section 14 proceeds to step S4. In step S4, the mode switching control maintains the fresh mode such that the interior/exterior air switching door 3 keeps the exterior air introducing port 4b open and keeps the interior air introducing port 4a closed.

Meanwhile, in step S2, if the current dew point temperature is determined to be below the minimum temperature threshold value $\beta$, then the interior/exterior air switching section 14 proceeds to step S3. In step S3, the mode switching control switches to the recirculation mode and outputs a control signal to an actuator of the interior/exterior air switching door 3 such that the interior/exterior air switching door 3 closes the exterior air introducing port 4b and opens the interior air introducing port 4a.

In step S5, the interior/exterior air switching section 14 determines if the current dew point temperature as detected by the dew point temperature acquiring sensor 10 is equal to or larger than the maximum temperature threshold value $\alpha$, which is greater than the minimum temperature threshold value $\beta$ ($\alpha > \beta$). If so, then the interior/exterior air switching section 14 proceeds to step S7.

In step S7, the mode switching control switches to the fresh mode such that the interior/exterior air switching door 3 closes the interior air introducing port 4a and opens exterior air introducing port 4b.

Meanwhile, in step S5, if the current dew point temperature is determined to be below the maximum temperature threshold value $\alpha$, then the interior/exterior air switching section 14 proceeds to step S6. In step S6, the mode switching control maintains the recirculation mode such that the interior/exterior air switching door 3 keeps the interior air introducing port 4a open and keeps the exterior air introducing port 4b closed.

Figure 6:
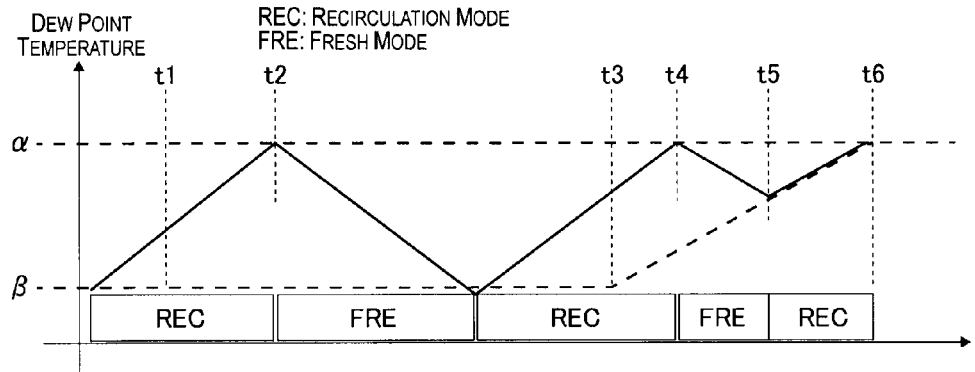
FIG. 6 is a time chart expressing a mode switching control scheme according to the first embodiment.

FIG. 6 is a time chart expressing a mode switching control scheme according to the first embodiment. In FIG. 6, a time t6 is an estimated (predicted) time of arrival, i.e., a driving end time. In the illustrated embodiment, the vehicle navigation unit (FIG. 1) automatically provides the driving end time to the driving end time acquiring section 12 based on an inputted destination. Of course, the driving end time can be obtained in other ways.

At a time t1, the recirculation mode is selected because the current dew point temperature, as determined by the dew point temperature acquiring sensor 10, is higher than the minimum temperature threshold value β and lower than the maximum temperature threshold value α. The minimum temperature threshold value β remains a constant value because the amount of time until the driving end time is reached is still long and the minimum temperature threshold value β is set to the dew point temperature of the exterior air.

At a time t2, the current dew point temperature exceeds the maximum temperature threshold value α and the interior/exterior air switching section 14 switches to the fresh mode. As a result, the dew point temperature in the vehicle cabin decreases. Until a time t3, since the minimum temperature threshold value β remains constant, the interior/exterior air switching section 14 switches between the recirculation mode and the fresh mode such that the dew point temperature stays between the maximum temperature threshold value α and the minimum temperature threshold value β.

At the time t3, a prescribed amount of time prior to the driving end time is reached. Thus, after the time t3, the mode switching control has begins setting the minimum temperature threshold value β to a higher value the driving end time approaches. At a time t4, the dew point temperature exceeds the maximum temperature threshold value α and the interior/exterior air switching section 14 selects the fresh mode. At a time t5, the minimum temperature threshold value β is set higher because the amount of time until the driving end time is reached is short. Thus, the induction port mode is switched from the fresh mode to the recirculation mode. If the minimum temperature threshold value β were left as a constant value, then the percentage of time during which the recirculation mode is selected would be lower because the driving end time would be reached with the fresh mode still selected. Consequently, the heating efficiency would decline. Conversely, with the first embodiment, the recirculation mode can be selected before driving ends because the minimum temperature threshold value β is set to increase in accordance with the amount of time remaining until the driving end time is reached. Since the temperature threshold value β is set to a value lower than the glass temperature, window fogging caused by condensation will not occur. The temperature threshold value β is illustrated as increasing in a linear fashion from time t5 to time t6 in FIG. 6 for the sake of simplicity. It will be apparent to those skilled in the art from this disclosure that the temperature threshold value β can increase in a non-linear fashion from time t5 to time t6 in FIG. 6, which can selectively include intervals where the temperature threshold value β remains constant.

At a time t6, the driving end time is reached and the dew point temperature has been controlled such that the current dew point temperature of the vehicle cabin reaches the maximum temperature threshold value α. That is, since the minimum threshold value β is set based on a relationship between the dew point temperature and an amount of time remaining until the driving end time is reached, the dew point temperature varies according to the same characteristic as a characteristic shown in FIG. 6 after the time t5. As a result, the dew point temperature reaches the maximum temperature threshold value α at the driving end time and the recirculation mode can be set efficiently.

The operational effects that can be obtained with the first embodiment explained heretofore will now be enumerated.

In accordance with a first aspect, as mentioned above, the vehicle heating and air conditioning system basically includes the interior/exterior air switching door 3 as an air introducing structure that can switch the flow of cabin intake air between the recirculation mode and the fresh mode, the heater core 7 (heating device) that heats the cabin intake air to a desired temperature, the driving time acquiring section 12 that acquires a driving end time (time t6) corresponding to a point in time at which driving of a vehicle is predicted to end, and the interior/exterior air switching section 14 that switches from the exterior air introducing mode to the interior air recirculation mode during a period of time from a prescribed point in time (time t5) until the driving end time (time t6) such that windshield fogging can be restricted while in the interior air recirculation mode. Consequently, with the vehicle heating and air conditioning system, window fogging can be prevented during a period lasting until a predicted driving end time and, since the amount of time during which the interior air recirculation mode is selected will become longer, the percentage of time during which the interior air recirculation mode is used will increase regardless of a driving pattern, thus enabling a heating efficiency to be improved.

In accordance with a second aspect, as mentioned above, the vehicle heating and air conditioning system further includes the dew point temperature acquiring sensor 10 that acquires a surface temperature of a vehicle interior side of the vehicle windshield WS, the glass temperature acquiring sensor 11 that acquires a surface temperature of a vehicle interior side of the vehicle windshield WS, and a threshold value setting section 13 that sets a minimum temperature threshold value β which increases as the driving end time approaches. Also, the interior/exterior switching section 14 further switches, during a time period prior to the prescribed point (time t5), from the interior air recirculation mode to the exterior air introducing mode upon determining the dew point temperature has exceeded a maximum temperature threshold value α, and from the exterior air introducing mode to the interior air recirculation mode upon determining the dew point temperature has fallen below the minimum temperature threshold value β. As the driving end time approaches, the remaining driving time becomes shorter. Since the temperature threshold value β is increased, the recirculation mode is selected earlier even if the dew point temperature is higher than normal. This corresponds to the prescribed point in time at which fogging of the windshield WS can be prevented from fogging as mentioned in the first aspect above. As a result, the percentage of time when the recirculation mode is selected can be increased and the heating efficiency can be improved. Since the apparatus switches to the recirculation mode based on the dew point temperature, highly precise switching timing can be achieved.

In accordance with a third aspect, the interior/exterior air switching section 14 of the vehicle heating and air conditioning system is further configured to execute control of the interior/exterior air introducing structure 3 such that the dew point temperature near the vehicle windshield WS reaches the maximum temperature threshold α at the driving end time (time t6). More specifically, the minimum temperature threshold value β is increased such that it is equal to the maximum temperature threshold value α at the driving end time. As a result, since the dew point temperature increases along with the minimum temperature threshold value β, the recirculation mode can be continued until the dew point temperature reaches the maximum temperature threshold value α at the driving end time. Thus, regardless of a driving pattern, the percentage of time during which the recirculation mode is used can be increased and a heating efficiency can be improved.

Referring now to FIGS. 7 to 11, a vehicle heating and air conditioning system in accordance with a second embodiment will now be explained. Since the second embodiment is basically the same as the first embodiment, only the features that are different will be explained.

Figure 7:
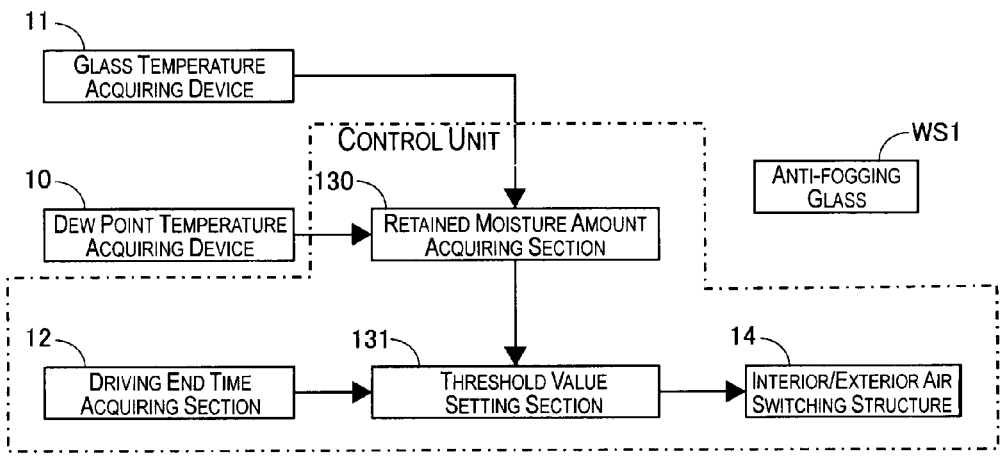
FIG. 7 is a control block diagram showing constituent features of a mode switching control of the vehicle heating and air conditioning system according to a second embodiment.

Referring to FIG. 7, is a control block diagram showing constituent features of a mode switching control of a vehicle air conditioning apparatus according to the second embodiment. The dew point temperature acquiring sensor 10, the glass temperature acquiring sensor 11, the driving time acquiring section 12, and the interior/exterior air switching section 14 are the same as in the first embodiment and explanations thereof will be omitted.

In the second embodiment, the control unit of the vehicle heating and air conditioning system is configured for use with a windshield that is made of anti-fog glass and that has a resin film coating provided on an inside surface of the glass. The resin film prevents fogging by absorbing moisture. In this second embodiment, the control unit of the vehicle heating and air conditioning system includes a retained moisture amount acquiring section 130 that estimates a condensation state of the resin film based on a glass temperature acquired by the glass temperature acquiring sensor 11 and a dew point temperature acquired by the dew point temperature acquiring sensor 10. The retained moisture amount acquiring section 130 then calculate an amount of moisture that has been absorbed and retained by the glass (resin film).

Next, a threshold value setting section 131 of the control unit of the vehicle heating and air conditioning system will be explained. In this second embodiment, a windshield fogging condition at which window fogging will occur is determined based on the amount of retained moisture of the glass. With anti-fogging glass, fogging occurs when the amount of moisture retained in the resin film exceeds a prescribed level. Thus, the threshold value setting section 131 sets a maximum retained moisture amount $\alpha'$ to a retained moisture amount at which the glass will start to fog or to a value slightly lower than that amount. For example, since an amount of moisture larger than 100% cannot be retained, the resin film can be allowed to retain moisture up to a limit where fogging will start to occur by setting the maximum retained moisture amount $\alpha'$ to 100% and fogging can be avoided by setting the maximum retained moisture amount $\alpha'$ to approximately 90%. A minimum retained moisture threshold value $\beta'$ is set to, for example, a minimum value that corresponds to the retained moisture amount that will be reached when exterior air is introduced or, to be conservative, to a value slightly higher. The minimum retained moisture threshold value $\beta'$ is revised based on a driving time amount.

Figure 10:
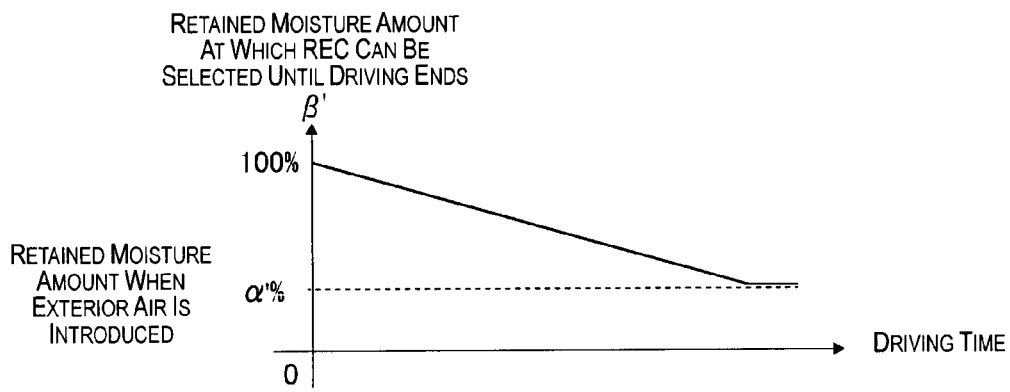
FIG. 10 is a characteristic diagram showing a water retention variation characteristic according to the second embodiment.

How the threshold value is corrected based on a driving time amount will now be explained in detail. First, a glass temperature and a dew point temperature are compared to estimate a retained moisture amount. Then from this data, a graph of required retained moisture amount versus riding time amount is prepared. FIG. 10 is a characteristic diagram expressing a retained moisture amount characteristic according to the second embodiment. A retained moisture amount calculated based on a remaining time before reaching a destination is set as a minimum threshold value used by the threshold value setting section 131, i.e., set as the minimum retained moisture threshold value $\beta'$. However, if the calculated retained moisture amount is smaller than a retained moisture amount estimated to be reached when exterior air is introduced, then the retained moisture amount $\alpha'$% estimated to be reached when exterior air is introduced is set as the minimum threshold value. In this way, interior air recirculation can be continued until such a state is reached that fogging will be on the verge of occurring when the driving end is reached.

The interior/exterior switching section 14 is configured to select the recirculation mode or the fresh mode as appropriate by switching the interior/exterior air switching door 3 based on the maximum retained moisture amount threshold value $\alpha'$ and the minimum retained moisture amount threshold value $\beta'$ set by the threshold value setting section 131. The control processing executed by the interior/exterior air switching section 14 of the control unit will now be explained.

Figure 8:
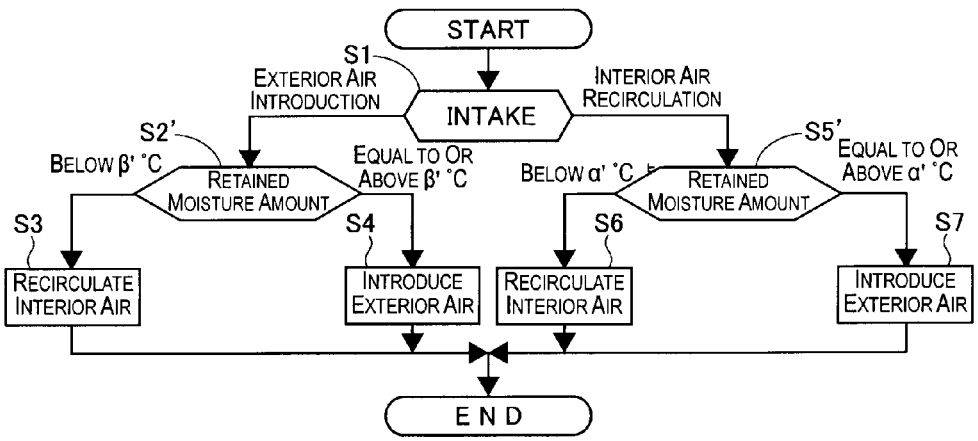
FIG. 8 is a flowchart expressing a mode switching control scheme according to the second embodiment.
Figure 9:
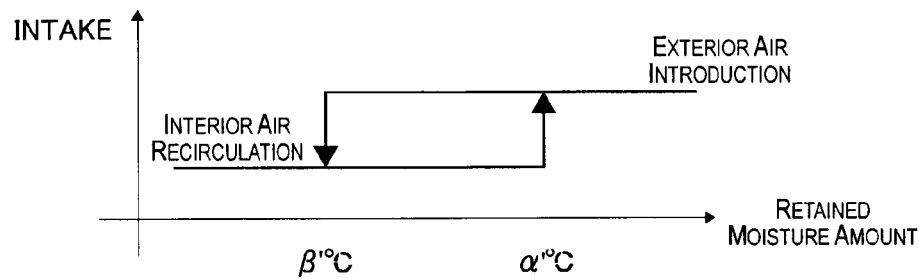
FIG. 9 is a map expressing a mode switching control scheme according to the second embodiment.

FIG. 8 is a flowchart expressing a mode switching control scheme according to the second embodiment, and FIG. 9 is a control map expressing a mode switching control scheme according to the second embodiment. FIGS. 8 and 9 show basically the same content. The mode switching control scheme according to the second embodiment is basically the same as the first embodiment. Thus, the portions of the mode switching control scheme of the second embodiment that are identical to the first embodiment will have the same reference numerals.

In step S1 of FIG. 8, the interior/exterior air switching section 14 determines if the currently selected mode is the fresh mode or the recirculation mode (i.e., the same as step S1 of FIG. 3). The mode switching control proceeds to step ST if the fresh mode is selected. On the other hand, the mode switching control proceeds to step S5' if the recirculation mode is selected.

In step S2' of FIG. 8, the interior/exterior air switching section 14 determines if the current retained moisture amount, as determined by the retained moisture amount acquiring section 130, is equal to or larger than the minimum retained moisture amount threshold value $\beta'$. If so, then the interior/exterior air switching section 14 proceeds to step S4. In step S4 of FIG. 8, the mode switching control maintains the fresh mode such that the interior/exterior air switching door 3 keeps the exterior air introducing port 4b open and keeps the interior air introducing port 4a closed (i.e., the same as step S4 of FIG. 3).

Meanwhile, in step S2' of FIG. 8, if the current retained moisture amount is smaller than the minimum retained moisture amount threshold value $\beta'$, then the interior/exterior air switching section 14 proceeds to step S3. In step S3, the mode switching control switches to the recirculation mode and outputs a control signal to an actuator of the interior/exterior air switching door 3 such that the interior/exterior air switching door 3 closes the exterior air introducing port 4b and opens the interior air introducing port 4a (i.e., the same as step S3 of FIG. 3).

In step S5' of FIG. 8, the interior/exterior air switching section 14 determines if the current retained moisture amount is equal to or larger than the maximum retained moisture amount threshold value $\alpha'$, which is greater than the minimum retained moisture amount threshold value $\beta'$ ($\alpha'>\beta'$). If so, then the interior/exterior air switching section 14 proceeds to step S7.

In step S7, the mode switching control switches to the fresh mode such that the interior/exterior air switching door 3 closes the interior air introducing port 4a and opens exterior air introducing port 4b (i.e., the same as step S7 of FIG. 3).

Meanwhile, in step S5' of FIG. 8, if the current retained moisture amount is smaller than the maximum retained moisture amount threshold value α', then the interior/exterior air switching section 14 proceeds to step S6. In step S6, the mode switching control maintains the recirculation mode such that the interior/exterior air switching door 3 keeps the interior air introducing port 4a open and keeps the exterior air introducing port 4b closed.

Figure 11:
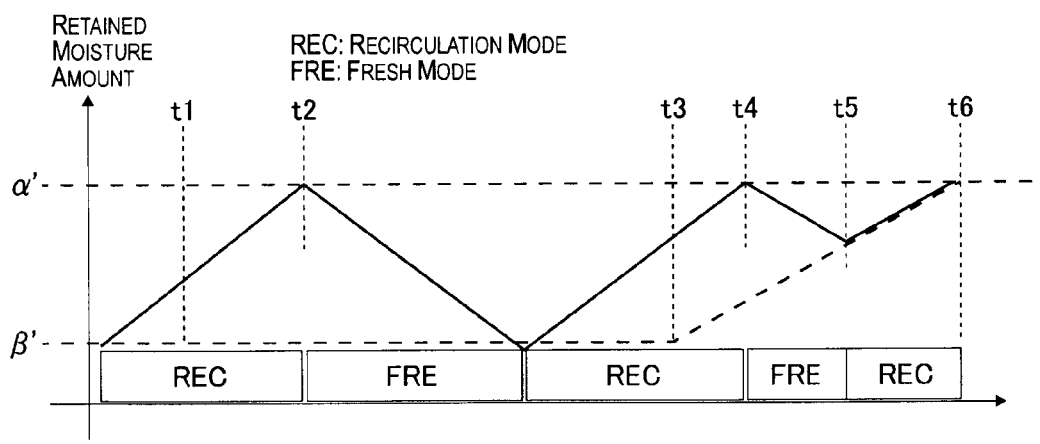
FIG. 11 is a time chart expressing a mode switching control scheme according to the second embodiment.

FIG. 11 is a time chart expressing a mode switching control scheme according to the second embodiment. FIG. 11, a time t6 is an estimated (predicted) time of arrival, i.e., a driving end time. In the illustrated embodiment, the vehicle navigation unit (FIG. 1) automatically provides the driving end time to the driving end time acquiring section 12 based on an inputted destination. Of course, the driving end time can be obtained in other ways.

At a time t1, the recirculation mode is selected because the current retained moisture amount, as determined by the retained moisture amount acquiring section 130 based on the dew point temperature and the surface temperature of the windshield, is higher than the minimum retained moisture amount threshold value β' and lower than the maximum retained moisture amount threshold value α'. The minimum retained moisture amount threshold value β' remains a constant value because the amount of time until the driving end time is reached is still long and the minimum retained moisture amount threshold value β' is set to a retained moisture amount that will be reached when the exterior air is introduced or, to be conservative, to a value slightly higher.

At a time t2, the retained moisture amount exceeds the maximum retained moisture amount threshold value α' and the interior/exterior air switching section 14 switches to the fresh mode. As a result, the retained moisture amount in the windshield decreases. Until a time t3, since the minimum retained moisture amount threshold value β' remains constant, the interior/exterior air switching section 14 switches between the recirculation mode and the fresh mode such that the retained moisture amount stays between the maximum retained moisture amount threshold value α' and the minimum retained moisture amount threshold value β'.

At the time t3 a prescribed amount of time prior to the driving end time is reached. Thus, after the time t3, the mode switching control has begins setting the minimum retained moisture amount threshold value β' to a higher value as the driving end time approaches. At a time t4, the current retained moisture exceeds the maximum retained moisture threshold value α' and the interior/exterior air switching section 14 selects the fresh mode. At a time t5, the minimum retained moisture amount threshold value β' is set higher because the amount of time until the driving end time is reached is short. Thus, the induction port mode is switched from the fresh mode to the recirculation mode. If the minimum retained moisture amount threshold value β' were left as a constant value, then the percentage of time during which the recirculation mode is selected would be lower because the driving end time would be reached with the fresh mode still selected. Consequently, the heating efficiency would decline. Conversely, with the second embodiment, the recirculation mode can be selected before driving ends because the minimum retained moisture amount threshold value β' is set to increase in accordance with the amount of time remaining until the driving end time is reached. Since the minimum retained moisture amount threshold value β' is set to a value lower than 100%, window fogging caused by condensation will not occur. The minimum retained moisture amount threshold value β' is illustrated as increasing in a linear fashion from time t5 to time t6 in FIG. 11 for the sake of simplicity. It will be apparent to those skilled in the art from this disclosure that the minimum retained moisture amount threshold value β' can increase in a non-linear fashion from time t5 to time t6 in FIG. 11, which can selectively include intervals where the minimum retained moisture amount threshold value β' remains constant.

At a time t6, the driving end time is reached and the retained moisture amount has been controlled such that it reached the maximum retained moisture amount threshold value α'. That is, since the minimum retained moisture amount threshold value β' is set based on a relationship between the retained moisture amount and an amount of time remaining until the driving end time is reached, the retained moisture amount varies according to the same characteristic as a characteristic shown in FIG. 11 after the time t5. As a result, the retained moisture amount reaches the maximum retained moisture amount threshold value α' at the driving end time and the recirculation mode can be set efficiently.

Along with the operational effects (the first to third aspects) obtained with the first embodiment as explained previously, the second embodiment exhibits some additional operational effects that will now be enumerated.

In accordance with a fourth aspect, in the second embodiment, the vehicle heating and air conditioning system is configured to be used in a vehicle having the windshield that is made of anti-fog glass and has a resin film coating provided on an inside surface of the glass. The resin film prevents fogging by absorbing moisture. The vehicle heating and air conditioning system according to the second embodiment further includes the dew point temperature acquiring sensor or device 10 that acquires a dew point temperature near the vehicle windshield, the glass temperature acquiring section 11 that acquires a surface temperature of a vehicle interior side of the vehicle windshield, a retained moisture amount acquiring section 130 that acquires a retained moisture amount that is indicative of an amount of moisture retained in the vehicle windshield based on the dew point temperature and the surface temperature, and the threshold value setting section 131 that sets a minimum retained moisture amount threshold value such that the minimum temperature threshold value increases as the driving end time approaches. The interior/exterior air switching section 14 switches, during a time period prior to the prescribed point, from the interior air recirculation mode to the exterior air introducing mode upon determining the retained moisture amount has exceeded a maximum retained moisture amount threshold value α', and from the exterior air introducing mode to the interior air recirculation mode upon determining the retained moisture amount has fallen below the minimum retained moisture amount threshold value β'. That is, as the driving end time draws near, the remaining driving time becomes shorter. At the same time, since the minimum retained moisture amount threshold value β' is increased, the apparatus switches to the recirculation mode early even if the retained moisture amount is higher than normal. This corresponds to the 'point in time when it is possible to prevent fogging of the windshield mentioned in the first aspect above. As a result, the percentage of time during which the recirculation mode is selected can be increased and the heating efficiency can be improved. Also, since the recirculation mode is selected based on a retained moisture amount, the mode can be switched with a higher degree of precision.

In accordance with a fifth aspect, in the second embodiment, the interior/exterior air switching section 14 of the vehicle heating and air conditioning system is configured execute control of the interior/exterior air introducing structure 3 such that the retained moisture amount reaches the maximum retained moisture amount threshold value $\alpha'$ at the driving end time. More specifically, minimum retained moisture amount threshold value $\beta'$ is increased such that it coincides with the maximum retained moisture threshold value $\alpha'$ at the driving end time. As a result, since the retained moisture amount increases as the minimum retained moisture amount threshold value $\beta'$ increases, the recirculation mode can remain selected until the retained moisture mount reaches the maximum retained moisture amount threshold value $\alpha'$ at the driving end time and the percentage of time during which the recirculation mode is selected can be maximized regardless of a driving pattern, thus enabling a heating efficiency to be improved.

Although the vehicle heating and air conditioning system is explained heretofore based on the first and second embodiments, the vehicle heating and air conditioning system is not limited to the specific constituent features of the embodiments. For example, in the embodiments the vehicle is provided with an internal combustion engine and heat from the engine is used in a heater core serving as a heating device. However, it is acceptable to apply the vehicle heating and air conditioning system to an electric vehicle that is not equipped with an engine. In such a case, since engine heat cannot be used for heat, it is necessary to extract electric power from a battery serving as a drive source in order to heat the heater core. In an electric vehicle, there is an intimate relationship between the battery power and the distance the vehicle can travel. Consequently, by increasing a heating efficiency, the amount of electric power required for generating heat can be reduced and a larger traveling distance can be secured, which is advantageous.

Although the embodiments of the vehicle heating and air conditioning system switch between the recirculation mode and the fresh mode, the vehicle heating and air conditioning system can also include any control scheme that serves to increase the percentage of warmed interior air mixed into air discharged by the air conditioning apparatus such that fogging does not occur. For example, instead of providing the recirculation mode, it is acceptable to provide a semi recirculation mode in which interior air and exterior air are mixed at a prescribed ratio and to execute control such that this mode is selected when a driving end time is drawing near.

Thus, while only selected embodiments have been chosen to illustrate the vehicle heating and air conditioning system, it will be apparent to those skilled in the art from this disclosure that various changes and modifications can be made herein without departing from the scope of the inventions as defined in the appended claims. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle heating and air conditioning system comprising:
   an interior/exterior air introducing structure configured to switch a flow of cabin intake air between an interior air recirculation mode and an exterior air introducing mode;
   a heating device arranged with respect to the interior/exterior air introducing structure to heat the cabin intake air being introduced by the interior/exterior air introducing structure;
   a driving end time acquiring section that estimates a driving end time corresponding to a point in time at which driving of a vehicle, which is equipped with the vehicle heating and air conditioning system, is predicted to end; and
   an interior/exterior air switching control section that switches the interior/exterior air introducing structure from the exterior air introducing mode to the interior air recirculation mode during a period of time from a prescribed point in time until the driving end time such that windshield fogging can be restricted while in the interior air recirculation mode.

2. The vehicle heating and air conditioning system according to claim 1, further comprising
   a dew point temperature acquiring section that acquires a dew point temperature near a vehicle windshield;
   a glass temperature acquiring section that acquires a surface temperature of a vehicle interior side of the vehicle windshield; and
   a threshold value setting section that sets a minimum temperature threshold value which increases as the driving end time approaches,
   the interior/exterior air switching device further switching, during a time period prior to the prescribed point, from the interior air recirculation mode to the exterior air introducing mode upon determining the dew point temperature has exceeded a maximum temperature threshold value, and from the exterior air introducing mode to the interior air recirculation mode upon determining the dew point temperature has fallen below the minimum temperature threshold value.

3. The vehicle heating and air conditioning system according to claim 2, wherein
   the interior/exterior air switching device further controls the interior/exterior air introducing structure such that the dew point temperature near the vehicle windshield reaches the maximum temperature threshold value at the driving end time.

4. The vehicle heating and air conditioning system according to claim 1, further comprising
   a vehicle windshield that includes an anti-fogging glass having a moisture absorbing film coated onto a surface on a vehicle interior side of the vehicle windshield;
   a dew point temperature acquiring section that acquires a dew point temperature near the vehicle windshield;
   a glass temperature acquiring section that acquires a surface temperature of the vehicle interior side of the vehicle windshield;
   a retained moisture amount acquiring section that acquires a retained moisture amount that is indicative of an amount of moisture retained in the vehicle windshield based on the dew point temperature and the surface temperature; and
   a threshold value setting section that sets a minimum retained moisture amount threshold value such that the minimum retained moisture amount threshold value increases as the driving end time approaches, the interior/exterior air switching device further switching, during a time period prior to the prescribed point, from the interior air recirculation mode to the exterior air introducing mode upon determining the retained moisture amount has exceeded a maximum retained moisture amount threshold value, and from the exterior air introducing mode to the interior air recirculation mode upon determining the retained moisture amount has fallen below the minimum retained moisture amount threshold value.

5. The vehicle heating and air conditioning system according to claim 4, wherein the interior/exterior air switching device further controls the interior/exterior air introducing structure such that the retained moisture amount reaches the maximum retained moisture amount threshold value at the driving end time.

6. The vehicle heating and air conditioning system according to claim 1, further comprising a vehicle navigation unit that provides the driving end time to the driving end time acquiring section based on an inputted destination.

* * * * *